Jan. 8, 1946.        C. D. PETERSON ET AL        2,392,762
BALKING RING CLUTCH
Filed April 26, 1939        2 Sheets-Sheet 1
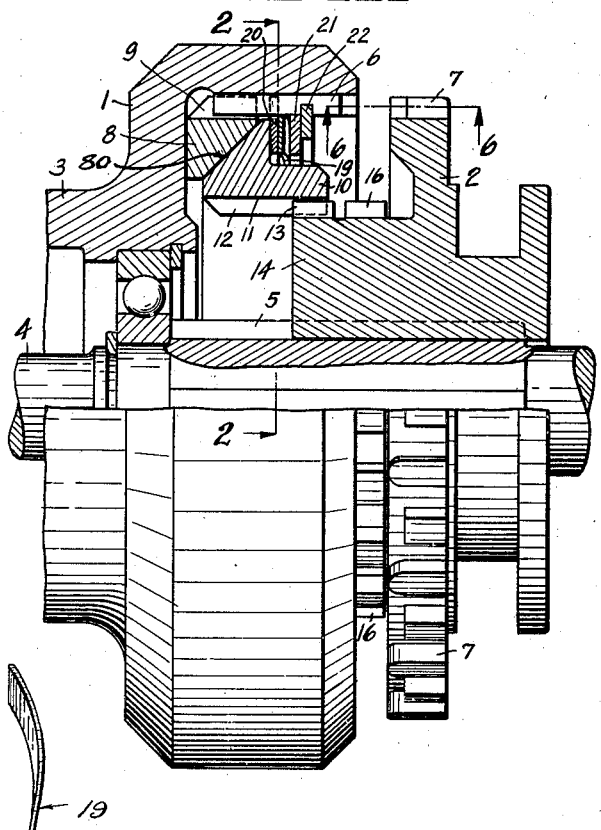
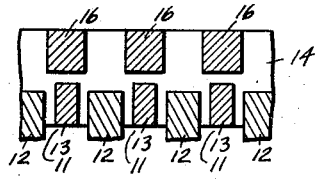
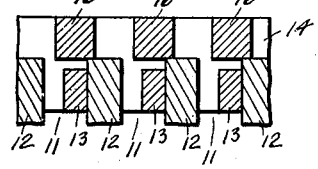
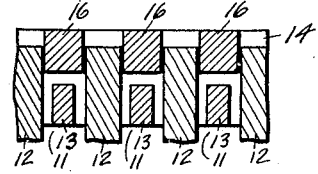
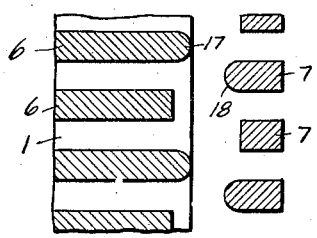
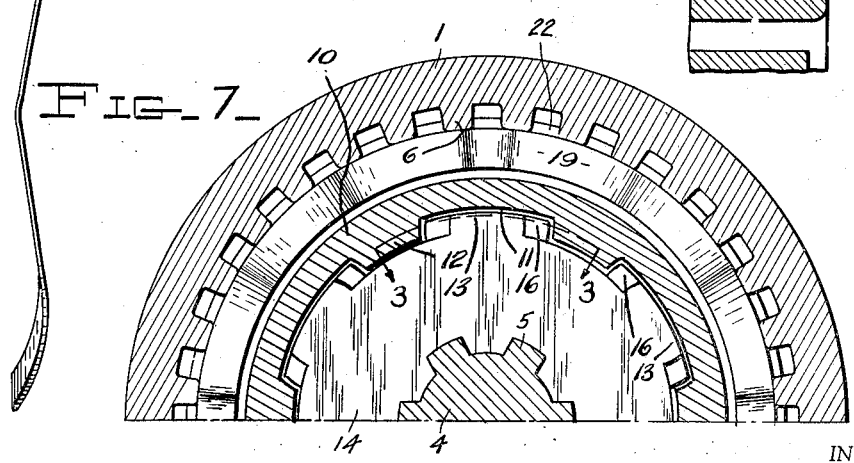
INVENTORS:
Carl D. Peterson
& Albert H. Deimel,
BY Bodell & Thompson
ATTORNEYS.

Jan. 8, 1946.   C. D. PETERSON ET AL   2,392,762
BALKING RING CLUTCH
Filed April 26, 1939   2 Sheets-Sheet 2

INVENTOR.
Carl D. Peterson &
BY Albert H. Deimel
Bodell & Thompson
ATTORNEYS.

Patented Jan. 8, 1946

2,392,762

UNITED STATES PATENT OFFICE 2,392,762

BALKING RING CLUTCH

Carl D. Peterson and Albert H. Deimel, Toledo, Ohio, assignors to Spicer Manufacturing Corporation, Toledo, Ohio, a corporation of Virginia Application April 26, 1939, Serial No. 270,182

20 Claims. (Cl. 192—53)

This invention relates to so-called balking ring type of clutches, that is, clutches consisting of driving and driven toothed clutch members having a relative axial shifting movement into and out of engaged position, and a balking ring which prevents engagement of toothed faces or balks or blocks out engagement of the toothed clutch faces until the speeds of the driving and driven members cross, and which, upon the crossing of the speeds, rocks the balking ring out of blocking-out position.

It has for its object a particularly simple and efficient and compact means for causing the balking ring or the friction face thereof to contact with a complemental friction face with sufficient pressure to drag thereon and rock the balking ring circumferentially into its operative, blocking or balking position, while the speeds of the driving and driven members are different and to rock the balking ring out of balking or blocking position to permit engagement of the toothed faces of the clutch members, when the speeds of the driving and driven members cross.

It further has for its object a simple and compact construction of the driving and driven members, balking ring, and the means for causing the balking ring to frictionally engage with controlled or predetermined dragging friction.

The speeds cross when the driving member rotating faster than the driven member decelerates to the slower speed of the driven member or when the driven member accelerates to the speed of the driving member, or when the driving member is rotating slower than the driven member at the time the clutch is to be shifted in, and is accelerated up to the speed of the driven member or the driven member allowed to decelerate to the speed of the driving member. Under such conditions, the balking ring, which is rocked and held in operative, blocking or balking position by the differential speeds, is rocked by the dragging friction into unblocking position at the instant the speeds cross, and thus permits the shifting of the toothed clutch faces into engagement.

The clutch is of the construction shown and described in the application of Carl D. Peterson and Albert H. Deimel, Serial No. 218,044, filed July 8, 1938, now matured into Patent No. 2,369,369, and this application is a continuation-in-part of that application.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view, partly in elevation, of the clutch.

Figure 2 is a sectional view on line 2—2, Figure 1.

Figure 3 is a fragmentary sectional view taken on line 3—3, Figure 2.

Figure 3 is a fragmentary sectional view taken on line 3—3, Figure 2.

Figures 4 and 5 are views, similar to Figure 3, showing the parts in different position during the operation thereof.

Figure 6 is a sectional view on line 6—6, Figure 1.

Figure 7 is an edge view of the spring washer seen in face view in Figure 2.

Figure 8:
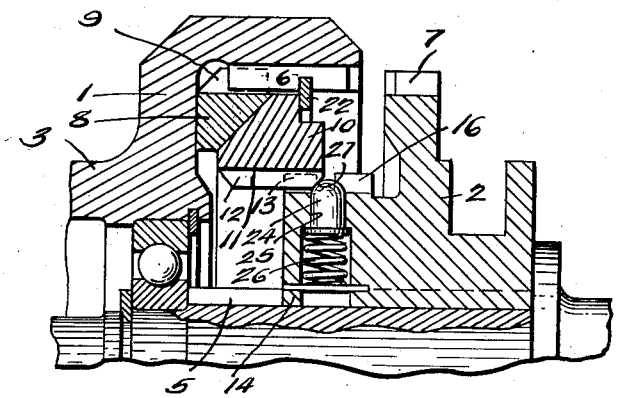
Figure 8 is a view similar to Figure 1 showing a modification of the invention.

The clutch comprises, generally, driving and driven toothed members or structures adapted to be positively clutched through interengaging clutch teeth, one of which is shiftable axially into and out of engagement with the other, one of the members being provided with a friction face, a balking ring or blocker rotatable with the other member or structure and also rotatable relatively thereto, within limits, and having a friction face for coacting with the former friction face, the balking ring being formed with transverse passages therethrough separated by inward projections or blocker means, and the clutch member with which the balking ring rotates, provided with projections or blocker means coacting with the former means and slidably fitting the passages and normally located out of the same in an axial direction and engageable with the balking ring on one side or the other of said passages when out of alinement therewith to effect balking or blocking out or temporarily preventing the engagement of the toothed faces of the clutch members, and means effective on the balking ring for initially lightly pressing its friction face into engagement with the friction face with which it coacts to cause the balking ring to drag and be rocked or rotated circumferentially, within limits, and thus shift the balking ring to carry its passages out of alinement with the projections until the speeds of the driving and driven members cross. As the speeds do cross, the balking ring is rocked circumferentially or rotated, within limits, and carries its passages into alinement with said projections. The means for lightly pressing the balking ring or blocker is interposed between one of the members or structures and the other member or structure on which the balking ring is mounted or with which the balking ring rotates. In the illustrated embodiment of the invention, the balking ring rotates with the driven member or structure, and hence this means or spring for pressing the balking ring is interposed between the driving member and the balking ring.

This invention relates to the means for causing the balking ring to engage its friction face with a coacting friction face with predetermined friction sufficient to cause the blocking ring to rock into blocking position, when the speeds of the driving and driven members are different and to rock into unblocking position, as the speeds of these members cross.

In the illustrated embodiment of the invention, the driven clutch member is shifted axially and the balking ring mounted to rotate therewith and also have a circumferential shifting or rotating movement, within limits, and coacts with a friction ring rotatable with the driving member, and the means forming the subject matter of this invention initially holds or initially presses the two rings together with controlled predetermined friction sufficient to rock the balking ring circumferentially, within limits, and to cause it to be controlled by the rotation of the driving member.

In a balking ring clutch, the balking ring is capable of rocking in a circumferential direction from central or unlocked position in either direction to locked positions. It rotates with the shiftable member of the clutch, but it is also rotatable within limits or rockable relatively thereto in circumferential directions. The balking ring is provided with transverse passages with which projections or shoulders on the shiftable clutch member slidably fit, the projections lapping or thrusting against the balking ring on one side or the other of the transverse passages, when the ring is rocked into locking position.

In this clutch, the projections or shoulders coact with the balking ring at a flat or straight angle, that is, a full blocking angle, in contradistinction to a cam angle, or a small angle of not sufficient incline to act as a cam or to slide inclined-plane fashion. Also, the friction face of the balking ring, which rotates with one clutch member (usually the driven clutch member) coacts with the complemental friction face on the other clutch member at such an angle that there is a minimum of synchronizing effect, and the friction faces are pressed into frictional contact with a controlled or predetermined pressure.

The balking ring is subject to two different frictional forces, one, the larger force, which is only applied when a shift is made, that is, when the gear shifting lever is operated, which larger force compresses the locking shoulders or projections against the balking ring, and also presses the friction face of the balking ring against the coacting friction face. As the speeds cross, the balking ring is rocked into unlocked position, wherein the projections or shoulders aline with the transverse passages of the balking ring, so that the shift may be completed, bringing the clutch teeth or jaws of the two clutch members into engagement. Both clutch members then have at this period, when the speeds cross, approximately the same speed of rotation. In order that the unlocking action, that is, the alining of transverse passages of the balking ring with the projections or shoulders, can act promptly and at the correct instant, the friction between the balking ring and the friction surface with which it coacts must be greater than the friction between the balking ring and the shoulders or projections on the shiftable clutch member. At the moment when relative rotation in one direction between the clutch members ceases, due to the speeds of rotation crossing, there is no relative movement, either between the balking ring and the shoulders and projections and between the balking ring and the friction surface with which it coacts. As soon as the speeds of the driving and driven clutch members cross, the balking ring must be swept across the locking shoulders into unlocked position. Thus, there must be no slip or relative motion between the ring and the friction surface with which it coacts. To accomplish this, the friction torque on the balking ring from the frictional surface with which it coacts, is made larger than the frictional torque of the locking shoulders or projections on the balking ring, by making the mean radius of the friction surface of the balking ring and the surface coacting therewith, larger than the mean radius of the surfaces of the projections or shoulders. This same effect may be accomplished by making the friction surfaces of the balking ring and the surface coacting therewith conical or by making it of such material, as to have a higher coefficient of friction than that at the locking shoulder or projection. In the present invention, the combination of these two methods is shown and the angle of the friction surface of the balking ring and the surface with which it coacts is approximately 45° or of such an angle as to have a negligible synchronizing effect. In the balking ring or clutch, no synchronizing effect, at least through friction, is depended upon or desired. Any frictional synchronizing force would have to be of considerable or relatively great magnitude. Also, because of the coacting flat or straight angles of the projecting shoulders and the balking ring, there is no cam action tending to rock the balking ring. The second frictional force to which the balking ring is subjected is a friction of small amount which acts at all times on the balking ring. This friction is applied between the balking ring and the friction surface with which it coacts. The purpose of this friction or force is to keep the balking ring at all times in proper relation or position to the locking shoulders or projections to overcome the inertia effect of the balking ring itself. For instance, if the clutch member (driven member) with which the balking ring rotates, that is, the clutch member having the locking shoulders or projections, is running slower than the other or driving clutch member and is rapidly accelerated, the balking ring would be held back by its inertia and might actually lag back, until it would be in position with the locking shoulder or projection, even though the clutch member (driven member) with which the balking ring rotates, is still rotating slower than the other clutch or driving member. If a shift is made under this condition, the balking ring will be violently snapped back, which snapping may damage the ring or the shoulders or projections; or the balking ring may get into unlocked position, even though the speeds of the clutch members are not crossed or equalized. This would result in clashing of the clutch teeth. A similar condition would result if one clutch member, in this embodiment of the invention, the driving clutch member, running faster than the other clutch member with which the balking ring rotates, is rapidly decelerated and the shift made.

The constant frictional force to press the friction face of the balking ring into contact with the coacting frictional surface on the other clutch member, overcomes the effect of the inertia of the balking ring and keeps the balking ring at all times in correct relation to the locking shoulders or projections, and thus avoids, under all conditions, possible engagement of the clutch teeth or jaws of the driving and driven members, until the speeds cross. The value of the force required in usual constructions is small, being determined by the inertia of the balking ring and the maximum acceleration or deceleration to which the clutch element having the shoulders or projections may be subjected.

Figure 9:
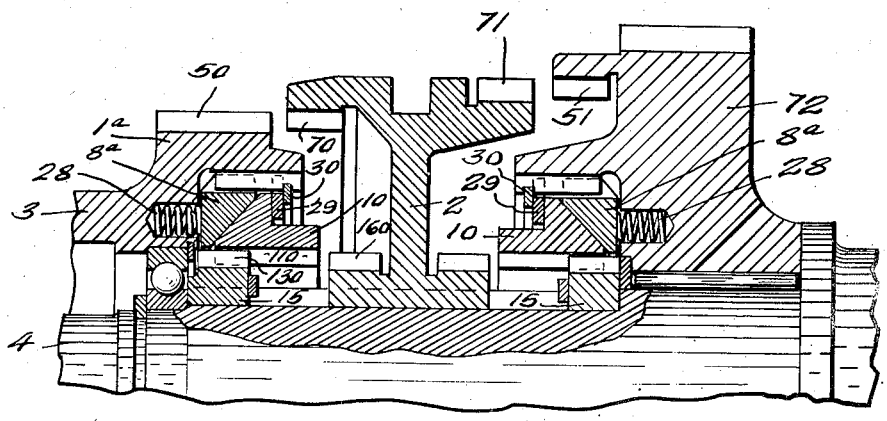
Figure 9 is a view similar to Figure 8 of a slightly different modified form and also showing a double balking ring clutch.

1 designates the driving member and 2 the driven member. The driving member is here shown as carried by a hollow shaft 3 surrounding a driven shaft 4 on which the driven clutch member 2 is mounted to shift axially. It is shown as slidably splined at 5 on the driven shaft 4. The clutch members 1, 2 are formed with jaws or clutch teeth 6 and 7, the teeth on the driving member being shown in Figures 1, 2 and 6, as an annular series of internal teeth, and the teeth 7, as external teeth, the driving member being shown as cup-shaped with internal teeth on the annular wall of the cup formation. The driving member 1 is shown in all the figures with a ring 8 provided with a friction face, as a conical friction face, the ring being shown as interlocked with the driving member to rotate therewith, as by peripheral teeth 9 interlocking with the inner ends of the clutch teeth 6, the friction ring 8 being located at the inner or bottom end of the cup-shaped formation. In Figure 9, the driving clutch member is shown as formed at the left side thereof with peripheral clutch teeth 50 and the driven member with internal teeth 70.

10 designates the balking ring, this being rotatable with the driven member 2 and is shown as mounted thereon in Figures 1 and 8. The ring 10 is provided with a friction face for coacting with that of the ring 8 and is provided with transverse passages 11 alternating with inwardly extending projections 12. These passages receive projections 13 rotatable with the driven clutch member 2, the projections 13 being of less width than the passages 11 to permit circumferential rocking or relative rotation of the balking ring 10 and the member 2, within limits. In the form shown in Figures 1 and 8, the projections 13 are radial teeth on the hub 14 of the driven clutch member 2, and in Figure 9, these projections 130 are provided on a collar 15 suitably mounted on the shaft 4. The driven member 2 is provided with radial shoulders or projections 16 on the hub, and 160 (Figure 9) of such width to slidably fit the passages 11 (Figures 1, 2 and 8) and 110 (Figure 9), they being normally located out of the passages (see Figures 3 and 4) and engageable with the ends of projections 12 (Figures 1, 2, 4 and 8) on one side or the other of said passages when the balking ring 10 is rocked circumferentially, within limits, by the drag of its friction face on the ring 8, when the driving and driven members are rotating at different speeds preliminary to engaging the clutch members 1 and 2 (Figure 4). When the speeds cross, and hence the balking ring rocked circumferentially, due to the drag thereof on the friction ring 8, the balking ring 10 carries the passages 11 into alinement with the projections 16, and hence, if shifting force is applied to the clutch member 2, the projections enter the passages 11 alined therewith (Figure 5) and permit the clutch teeth 7 to interlock with the clutch teeth 6. For facilitating this interlocking, alternate teeth of each series are shorter than the other teeth, and the longer teeth rounded or chamfered at 17 and 18, as seen in Figure 6.

The construction for causing the balking ring to initially contact the coacting friction surface on the clutch member 1 with sufficient drag to rock the balking ring circumferentially, within limits, into its balking or blocking-out position, or the position shown in Figure 4, and to shift it into unblocking position, as the speeds of the driving and driven members 1, 2 cross, that is, into the position shown in Figure 3, to permit shifting of the clutch member 2 into engaged position, as shown in Figure 5, consists of resilient means acting to effect relative movement of the balking ring and the ring or part with which it coacts to cause the balking ring to lightly frictionally engage the part or surface with which it frictionally engages.

In Figures 1, 2 and 8, spring means is shown for applying the light fixed pressure to the balking ring, this being shown in Figures 1 and 7 as a spring 19 in the form of a wavy washer interposed between abutments 20 and 21 (Figure 1) thrusting respectively against an annular face on the balking ring and a lock ring 22. The abutment 20 is interlocked with the clutch member 1 to rotate therewith and is provided with peripheral teeth which interlock with portions or extensions of the clutch teeth 6. The abutment 20, however, is capable of axial movement under the influence of the spring 19. The abutment 21 merely thrusts against the split lock ring 22 interlocked in notches in the teeth 6. The abutments, locking ring and spring 19 are located in a suitable annular recess in the balking ring. The spring 19 exerts sufficient fixed pressure on the balking ring 10 to press its friction face against the friction face of the ring 8 to cause a light drag on the balking ring 10, this being sufficient to overcome inertia and to shift it from the position shown in Figure 3 to that shown in Figure 4, when under differential speeds of the driving and driven clutch members preliminary to clutch engagement, and also shift it back into the position shown in Figure 3, as the speeds cross.

In order that the frictional torque on the balking ring 10 from the ring 8 may be made larger than the frictional torque between the locking shoulders or projections 16 and the balking ring, when in the relative position shown in Figure 4, the mean radius of these friction surfaces designated 80 is larger than the mean radius of the engaging surfaces of the shoulders or projections 16 and the balking ring 12, where they engage, as illustrated in Figure 4, and also the surfaces at 80 are made conical and at such an angle, as of approximately 45°, as to minimize the synchronizing effect of the coacting friction surfaces.

In Figure 9, a double clutch is shown shiftable in opposite directions from neutral to connect two shafts in direct drive relation when shifted in one direction, as to the left from neutral, and in indirect drive relation through trains of gears when shifted in the other direction or to the right from neutral. For facilitating the assembly of the double clutch on the shaft 4, two rings 15 are provided on opposite sides of the shiftable clutch section 2 for driving the balking rings, which are located on opposite sides of the shiftable section 2 and rotatable with the section 2 and also rockable in circumferential directions relative to the section 2.

The use of the rings or collars 15 in a double clutch is for convenience in manufacturing, in order that the teeth of each balking ring may remain interlocked with its companion ring 15 when the shiftable clutch member 2 is shifted from neutral to make a clutching engagement through the other balking ring.

In Figure 9, when the section 2 is shifted to the left from neutral, it engages the clutch teeth 70 and 50 after the speeds have crossed and the balking ring 10 shifted to unlocked position. When the shiftable clutch member 2 is shifted from right to neutral, it engages clutch teeth 71 with clutch teeth 51 on a gear 72 normally mounted on the shaft 4 to rotate about the same and clutchable thereto by the clutch member 2, after the balking ring 10 on the right side of the shiftable member 2 has moved to unlocked position by the crossing of the speeds. The gear 72, it will be understood, is driven from the gear 50 through countershaft gears, as in any well known transmission gearing.

In Figure 8, the initial frictional engagement of the balking ring 10 and friction ring 8 is effected through a spring and cam action of one or more radially movable plungers, as the plunger 24, mounted in a radial passage 25 in the hub of the driven member and pressed outwardly by a spring 26 in said passage, the plunger coacting with an inclined cam face 27 on the ends of the projections 12 which bound the passages 11 of the balking ring 10. The relative circumferential movement of the balking ring is not sufficient to dislodge the bevelled ends 27 of these projections from the plungers 24. In Figure 9, instead of the balking ring 10 being acted upon by a spring or other means tending to shift it axially, the ring 8ª is shown as yieldingly pressed axially, by any suitable number of springs, as the spring 28 located in a bore or recess in the driving member 1ª and thrusting against the friction ring 8ª to thrust it toward the balking ring 10, the balking ring thrusting against an abutment 29 rotatable with the driving member 1 and held in place by a lock ring 30.

In any form of the invention, the balking ring is subjected to constant frictional force, which overcomes the effect of the inertia of the ring and keeps the ring at all times in correct relation to the locking shoulders or projections.

What we claim is:

1. In a balking ring clutch, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of means operating to engage the friction faces with sufficient dragging friction to neutralize the inertia of the balking ring, and thereby locate the balking ring, in a circumferential direction, relatively to the blocking projections to block engagement of the clutch members until the speeds cross, said projections coacting with the balking ring on one side or the other of said passages at full blocking angles.

2. In a balking ring clutch, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of said projections frictionally coacting with the balking ring in the latter position at full blocking angles, and means operable to engage the friction faces with greater friction than said projections engage the balking ring in a circumferential direction relatively to the projections to block engagement of the clutch members until the speeds cross.

3. In a balking ring clutch, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of said projections frictionally coacting with the ring in the latter position at full blocking angles, the mean radius of the coacting friction faces being greater than that of the projections, and means operable to engage the friction faces with pressure in addition to that effected by the thrust of the projections against the balking ring before the speeds cross.

4. In a balking ring clutch, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of said projections frictionally coacting with the balking ring in the latter position at full blocking angles, and means operable to engage the friction faces with a greater torque friction than the friction between said projections and the balking ring when shifting pressure is applied to the clutch member provided with said projections.

5. In a balking ring clutch, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of said friction faces being conoidal of such incline as to minimize the synchronizing action of the friction faces, and said projections frictionally engaging with the balking ring in the latter relative position of the balking ring and said projections, at full blocking angles, and means operable to engage the friction faces with sufficient dragging friction to overcome the inertia of the balking ring and greater than that between said projections and the balking ring.

6. In a balking ring clutch, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of said friction faces being conoidal and of such incline as to minimize the synchronizing action of the friction faces, and said projections frictionally engaging with the balking ring in the latter relative position of the balking ring and said projections, at full blocking angles, and means operable to engage the friction faces with sufficient dragging friction to overcome the inertia of the balking ring and greater than that between said projections and the balking ring, the mean radius of the coacting friction faces being greater than that of the projections.

7. In a balking ring clutch, the combination of driving and driven toothed clutch members, one of which is shiftable axially into and out of engagement with the other, one of said members being provided with a friction face, a balking ring rotatable with the other member and also rotatable relatively thereto, within limits, and having a friction face coacting with the former friction face, the balking ring and the member with which it rotates having relative axial movement during the shifting of the shiftable clutch member, the balking ring being formed with transverse passages therethrough and the clutch member with which it rotates being provided with projections for slidably fitting said passages and normally located out of the same and engageable at a full blocking angle with the balking ring on one side or the other of said passages when out of alinement therewith.

8. In a balking ring clutch, the combination with driving and driven toothed clutch members, one of which is shiftable axially into and out of engagement with the other, one of said members being provided with a friction face, a balking ring rotatable with the other member and also rotatable relatively thereto, within limits, and having a friction face coacting with the former friction face, the balking ring and the member with which it rotates having relative axial movement during the shifting of the shiftable clutch member, the balking ring being formed with transverse passages therethrough and the clutch member with which it rotates provided with projections for slidably fitting said passages, and normally located out of the same and engageable with the balking ring on one side or the other of said passages when out of alinement therewith; of coacting cam means on the balking ring and the clutch member with which it rotates arranged to press the balking ring axially relatively to the clutch member with which it coacts.

9. In a balking ring clutch, the combination with driving and driven toothed clutch members, one of which is shiftable axially into and out of engagement with the other, one of said members being provided with a friction face, a balking ring rotatable with the other member and also rotatable relatively thereto, within limits, and having a friction face coacting with the former friction face, the balking ring and the member with which it rotates having relative axial movement during the shifting of the shiftable clutch member, the balking ring being formed with transverse passages therethrough and the clutch member with which it rotates provided with projections for slidably fitting said passages and normally located out of the same and engageable with the balking ring on one side or the other of said passages when out of alinement therewith; of coacting cam means including parts on the balking ring and the clutch member with which it rotates arranged to press the balking ring axially relatively to the clutch member with which it coacts, one of said parts being a spring-pressed radially movable plunger, and the other part a cam face with which the plunger coacts.

10. In a balking ring clutch, the combination with driving and driven toothed clutch members, one of which is shiftable axially into and out of engagement with the other, one of said members being provided with a friction face, a balking ring rotatable with the other member and also rotatable relatively thereto, within limits, and having a friction face coacting with the former friction face, the balking ring and the member with which it rotates having relative axial movement during the shifting of the shiftable clutch member, the balking ring being formed with transverse passages therethrough and the clutch member with which it rotates provided with projections for slidably fitting said passages and normally located out of the same and engageable with the balking ring on one side or the other of said passages when out of alinement therewith; of coacting cam means between the balking ring and the clutch member with which it rotates comprising a radially movable plunger on said clutch member, and a cam face inclined out of a radial plane on the balking ring with which the plunger coacts.

11. In a balking ring clutch, the combination with driving and driven toothed clutch members, one of which is shiftable axially into and out of engagement with the other, one of said members being provided with a friction face, a balking ring rotatable with the other member and also rotatable relatively thereto, within limits, and having a friction face coacting with the former friction face, the balking ring and the member with which it rotates having relative axial movement during the shifting of the shiftable clutch member, the balking ring being formed with transverse passages therethrough and the clutch member with which it rotates provided with projections for slidably fitting said passages and normally located out of the same and engageable with the balking ring on one side or the other of said passages when out of alinement therewith; or coacting cam means between the balking ring and the clutch member with which it rotates comprising a radially movable plunger on said clutch member, and a cam face inclined out of a radial plane on the balking ring with which the plunger coacts, the plunger being spring-pressed.

12. In a balking ring clutch, the combination with driving and driven toothed clutch members, one of which is shiftable axially into and out of engagement with the other, one of said members being provided with a friction face, a balking ring rotatable with the other member and also rotatable relatively thereto, within limits, and having a friction face coacting with the former friction face, the balking ring and the member with which it rotates having relative axial movement during the shifting of the shiftable clutch member, the balking ring being formed with transverse passages therethrough and the clutch member with which it rotates provided with projections for slidably fitting said passages and normally located out of the same; of said balking ring and said projections frictionally engaging at full blocking angles on one side or the other of said passages when out of alinement therewith, and means operable to shift the balking ring into engagement with the friction face with which it coacts with sufficient pressure to cause the balking ring to drag on said friction surface during differential speeds of the driving and driven members and overcome the friction between the balking ring and said projections.

13. In combination with driving and driven toothed clutch members having relative axial shifting movement into and out of inter-engaging relation, and a balking ring rotatable with one of said members and having a rocking movement in a circumferential direction relative thereto into and out of balking position, the other toothed clutch member having a ring formed with a friction face, the balking ring having a friction face coacting with the friction face on the ring of the other toothed clutch member and means for effecting the relative axial shifting movement; of spring means acting on one of said rings to thrust the same axially toward the other and hold the friction faces lightly engaged with sufficient friction to cause the balking ring to drag and be rocked by the other ring into balking position when the speeds are different, and to be moved out of balking position as the speeds cross, and of the member with which the balking ring rotates having projections thrusting against the balking ring when shifting-in force is applied, when the balking ring is in balking position, and the balking ring having passages for receiving said projections when the balking ring is rocked from balking position to unbalking position, said projections coacting with the balking ring at full blocking angles and the friction capacity of the balking ring and the ring with which it coacts being greater than that of the projections and the balking ring.

14. In combination with driving and driven toothed clutch members having relative axial shifting movement into and out of inter-engaging relation, and a balking ring rotatable with one of said members and having a rocking movement in a circumferential direction relative thereto into and out of balking position, the other toothed clutch member having a ring formed with a friction face, the balking ring having a friction face coacting with the friction face on the ring of the other toothed clutch member and means for effecting the relative axial shifting movement; of spring means acting on one of said rings to thrust the same axially toward the other and hold the friction faces lightly engaged with sufficient friction to cause the balking ring to drag and be rocked by the other ring into balking position when the speeds are different, and to be moved out of balking position as the speeds cross, said spring means being annularly arranged to press at spaced apart points on the ring pressed thereby, and of the member with which the balking ring rotates having projections thrusting against the balking ring when shifting-in force is applied, when the balking ring is in balking position, and the balking ring having passages for receiving said projections when the balking ring is rocked from balking position to unbalking position, said projections coacting with the balking ring at full blocking angles and the friction capacity of the balking ring and the ring with which it coacts being greater than that of the projections and the balking ring.

15. In combination with driving and driven toothed clutch members having relative axial shifting movement into and out of inter-engaging relation, and a balking ring rotatable with one of said members and having a rocking movement in a circumferential direction relative thereto into and out of balking position, the other toothed clutch member having a ring formed with a friction face, the balking ring having a friction face coacting with the friction face on the ring of the other toothed clutch member and means for effecting the relative axial shifting movement; of spring means acting on one of said rings to thrust the same axially toward the other and hold the friction faces lightly engaged with sufficient friction to cause the balking ring to drag and be rocked by the other ring into balking position when the speeds are different, and to be moved out of balking position as the speeds cross, said spring means comprising an undulated or waved washer arranged to press at spaced apart points against the ring pressed thereby, and of the member with which the balking ring rotates having projections thrusting against the balking ring when shifting-in force is applied, when the balking ring is in balking position, and the balking ring having passages for receiving said projections when the balking ring is rocked from balking position to unbalking position, said projections coacting with the balking ring at full blocking angles and the friction capacity of the balking ring and the ring with which it coacts being greater than that of the projections and the balking ring.

16. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and yielding means carried by said first one of said structures and acting on said blocker member to urge the latter longitudinally with respect to the axis of rotation thereof into said blocker-energizing engagement with said friction surface whereby to induce said positioning of said blocker member in said blocking relationship prior to clutching shift of said clutching sleeve.

17. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a spring member engaging said first one of said structures and acting on said blocker member for urging the latter longitudinally with respect to the axis of rotation thereof into said blocker-energizing engagement with said friction surface whereby to induce said positioning of said blocker member in said blocking relationship prior to clutching shift of said clutching sleeve.

18. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and yielding means acting between said first one of said structures and said blocker member operating to exert an axial thrust therebetween to establish said blocker-energizing engagement whereby to induce said positioning of said blocker member in said blocking relationship prior to clutching shift of said clutching sleeve.

19. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member mounted on said friction surface and having blocker means, said blocker member having a rotatable connection with said other structure accommodating limited rotation of the blocker member relative to said other structure for accommodating position of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a member carried by said first one of said structures and so disposed in thrust-transmitting relationship with respect to said blocker as to thrust the latter axially with respect to said friction surface.

20. In a balking ring clutch, the combination with driving and driven toothed members, one of which is shiftable axially into and out of engagement with the other, a first ring provided with a friction face rotatable with one of said members, a second and balking ring rotatable with the other clutch member and also rotatable relatively thereto, within limits, the balking ring and the member with which it rotates having relative axial movement and the two rings also having slight relative axial movement, the balking ring being provided with transverse passages therethrough and the element with which it rotates provided with projections slidably fitting said passages and normally located out of the same and engageable with the balking ring on one side or the other of said passages when out of alinement therewith; of means associated with said first ring to cause the same to frictionally contact the balking ring preliminary to engagement of the clutch teeth of the members.

CARL D. PETERSON.
ALBERT H. DEIMEL.